UNITED STATES PATENT OFFICE.

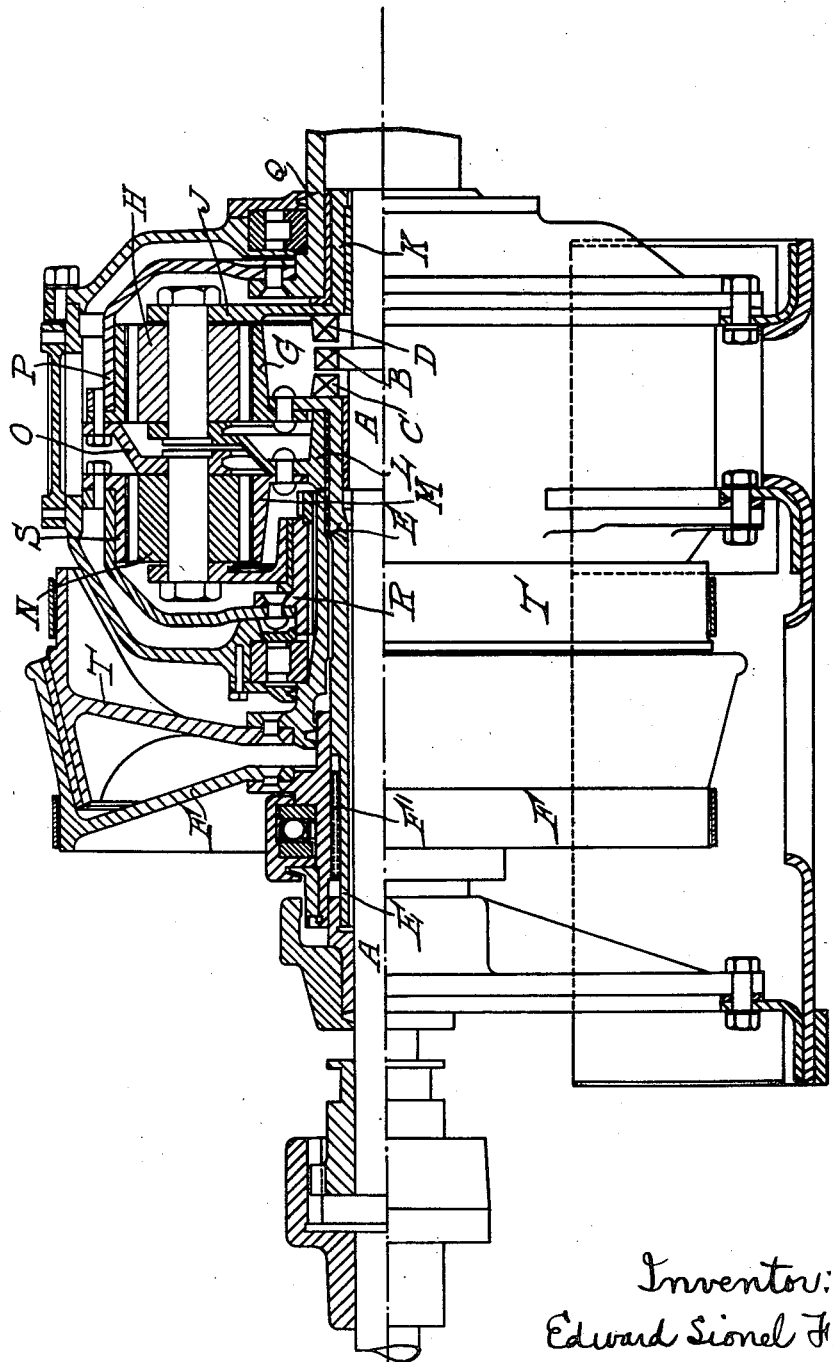

EDWARD LIONEL FIRTH, OF LONDON, ENGLAND, ASSIGNOR TO ROADLESS TRACTION LIMITED, OF LONDON, ENGLAND.

VARIABLE-SPEED GEAR.

1,409,536. Specification of Letters Patent. Patented Mar. 14, 1922.

Application filed June 21, 1921. Serial No. 479,314.

(GRANTED UNDER THE PROVISIONS OF THE ACT OF MARCH 3, 1921, 41 STAT. L., 1313.)

*To all whom it may concern:*

Be it known that I, EDWARD LIONEL FIRTH, a subject of the King of Great Britain, residing at Charlton House, Old Charlton, London, England, have invented new and useful Improvements in Variable-Speed Gears, (for which I have filed application in Great Britain on Nov. 20, 1918, Patent Number 129,903, and in Canada on June 24, 1920,) of which the following is a specification.

This invention relates to variable speed gear for use more particularly with heavy tractors using high powered engines.

According to this invention a driving dog is mounted upon a driving shaft and is adapted to engage with one or other of two dogs when the shaft is slidden axially. One of these dogs is fixed to a sleeve on the driving shaft, and to the sleeve is fixed one member of a clutch and a sun wheel meshing with planet pinions on a cage carried by another sleeve on the driving shaft, whilst the other dog is fixed to the cage. The cage is connected to a sleeve on which is mounted a sun wheel in mesh with planet pinions on a cage connected to an internally toothed ring fixed to the driven shaft, and on a sleeve on the driving shaft is another internally toothed ring connected to the other member of the clutch.

The accompanying drawing is a section of a variable speed gear constructed in accordance with this invention.

Mounted upon the driving shaft A is a driving dog B adapted to engage with one or other of two dogs C and D when the shaft is slidden axially. One of these dogs C is fixed to a sleeve E on the driving shaft A and ot the sleeve E is fixed by a feather F' one member F of a clutch and a sun wheel G meshing with planet pinions H on a cage J carried by another sleeve K on the driving shaft, whilst the other dog D is fixed to the cage J. The cage J is connected to a sleeve L on which is mounted a sun wheel M in mesh with planet pinions N on a cage O connected to an internally toothed ring P fixed to the driven shaft Q, and on a sleeve R on the driving shaft A is another internally toothed ring S connected to the other member T of the clutch. Both members of the clutch are provided with means for holding them so that they cannot turn. This means may comprise brake bands U and V engaging the outer surface of the members F and T respectively, which may be operated in any desired manner. Such devices are common in the art.

When the gear is arranged to drive on the first or low speed, the driving shaft A is moved so that the driving dog B engages with the dog C and the clutch members are disengaged, the member T being held stationary so that the drive is from the sun wheel G through the planet pinions H and cage J to the sun wheel M which drives the ring P upon the driven shaft Q through the planet pinions N and cage O.

When driving on the second speed the driving dog B on the driving shaft A is in gear with the dog D on the cage J, the clutch members F and T being disengaged and the member T in gear with the cage O being held stationary. The sun wheel M is then directly driven by the driving shaft A, carrying round the planet pinions N and the cage O which as before is directly connected through the ring P to the driven shaft Q.

When driving on the third speed, the members F and T of the clutch are engaged and the driving and driven shafts turn at the same speed, the driving dog B being engaged with the same dog D.

When driving on the fourth or top speed, the driving dog B is in gear with the dog D and the clutch members F and T are disengaged. The clutch member F is held stationary and the planet pinions H of the first cage J are directly driven by the driving shaft A, so turning the ring P fixed to the driven shaft Q.

What I claim is:—

1. In variable speed gear, the combination of a driving shaft, a dog carried thereby, a sleeve on said shaft, a clutch member, a sun wheel and a second dog carried by said sleeve, the second dog adapted to engage the first dog when desired, a cooperating clutch member, a cage, planet pinions carried by said cage and meshing with said sun wheel, a second sleeve on said shaft and connected to said cage, a second sun wheel carried by said second sleeve, a second cage, planet pinions carried by said second cage and meshing with the second sun wheel, and means connecting said second cage with a driven shaft.

2. In variable speed gear, the combination of a driving shaft, a dog carried thereby, a sleeve on said shaft, a dog carried thereby and optionally engaging the first dog, a sun wheel also carried by said sleeve, a second sleeve on said shaft, a second sun wheel carried by said second sleeve, planet pinions meshing with said second sun wheel, a cage therefor having a member provided with an internal gear, planet pinions meshing with said first sun wheel and also with said internal gear, and means connecting said internal gear member to a driven shaft.

3. In variable speed gear, the combination of a driving shaft, a dog carried thereby, a sleeve on said shaft, a second dog carried thereby, a sun wheel also carried by said sleeve, planet pinions engaging said sun wheel, a cage therefor, a third dog carried by said cage, the dog carried by the driving shaft being adapted to engage with either the second or third dog, an internal gear member meshing with said planet pinions, and means connecting said member to a driven shaft.

4. In variable speed gear, the combination of a driving shaft, a dog carried thereby, a sleeve on said shaft, a second dog, a clutch member and a sun wheel carried by said sleeve, a cooperating clutch member, a second sleeve, a second sun wheel carried thereby, planet pinions meshing with the first sun wheel, a cage therefor connected to the second sleeve, planet pinions meshing with said second sun wheel, a cage therefor, a member connected to said second cage and having an internal gear meshing with the first planet pinions, and means connecting said internal gear member to a driven shaft.

5. In variable speed mechanism, the combination of a driving shaft, a dog carried thereby, a sleeve on said shaft, a second dog, a clutch member and a sun wheel carried by said sleeve, a second sleeve, a second sun wheel carried thereby, planet pinions meshing with the first sun wheel, a cage therefor having a second dog and being connected to the second sleeve, planet pinions meshing with said second sun wheel, a second clutch member adapted to engage the first clutch member, and having a member provided with an internal gear meshing with the second planet pinions, a cage for said second planet pinions having an internal gear member meshing with said first planet pinions, and means connecting said last-named internal gear member with a driven gear.

6. In variable speed gear, the combination of a driving shaft, a dog carried thereby, a sleeve on said shaft, a clutch member carried thereby, a second clutch member adapted to engage the first clutch member, a second sleeve, a sun wheel thereon, planet pinions thereon, a member connected with the second clutch member and having an internal gear adapted to mesh with the planet pinions, a cage for said planet pinions, a member connected therewith and having an internal gear, and means for connecting said member to a driven shaft.

7. In variable speed gear, the combination of a driving shaft, a dog carried thereby, a sleeve on said shaft, a dog, sun wheel and clutch member carried by said sleeve, a second sleeve, a second sun member carried thereby, a second clutch member adapted to mesh with the first clutch member, and having an internal gear member, planet pinions adapted to mesh with the second sun member and said internal gear member, a cage therefor, and means connecting said cage to a driven shaft.

8. In variable speed gear, the combination of a driving shaft, a dog carried thereby, a sleeve on said shaft having a second dog and a clutch member, a second clutch member adapted to engage said first clutch member, means for holding either clutch member stationary when disengaged, a sun wheel carried by said sleeve, a second sleeve, a second sun member carried thereby, planet pinions meshing with said first sun member, a cage therefor having a third dog and connected with said second sleeve, planet pinions engaging said second sun wheel, an internal gear member carried by said second clutch member and meshing with said second planet pinions, a cage for the second planet pinions, an internal gear member connected therewith and meshing with said first planet pinions, and means connecting said internal gear member with a driven shaft, the first dog being adapted to engage either the second or third dog as desired.

9. In variable speed gear, the combination of a driving shaft, a driven shaft, a dog on the driving shaft, a sleeve on the driving shaft carrying a second dog and one member of a clutch, another clutch member to cooperate therewith, a second sleeve on the driving shaft, a cage carried by said second sleeve and having a third dog, planet pinions on said cage, a sun wheel meshing with the planet pinions, a third sleeve connected to said cage, a second sun wheel mounted on the third sleeve, an internally toothed ring fixed to the driven shaft, a cage connected to the toothed ring, a second set of planet pinions on said cage and meshing with said second sun wheel, a fourth sleeve, a second internally toothed ring carried thereby and connected to the other member of the clutch, said first dog being shiftable to engage either the second or the third dog.

In testimony that I claim the foregoing as my invention I have signed my name this 31st day of May 1921.

EDWARD LIONEL FIRTH,